United States Patent [19]
Mathisen

[11] 3,843,165
[45] Oct. 22, 1974

[54] DRAW BAR

[75] Inventor: Martin H. Mathisen, Sun Valley, Calif.

[73] Assignee: Eaz-Lift Spring Corporation, Sun Valley, Calif.

[22] Filed: June 19, 1972

[21] Appl. No.: 264,327

[52] U.S. Cl.................................. 280/495, 280/406
[51] Int. Cl............................................. B60d 1/14
[58] Field of Search ........ 280/406 A, 491 B, 491 E, 280/495, 497, 489, 432

[56] References Cited
UNITED STATES PATENTS

| | | | |
|---|---|---|---|
| 2,622,892 | 12/1952 | Lowman | 280/495 |
| 2,772,893 | 12/1956 | Ivettstein | 280/406 A |
| 2,872,212 | 2/1959 | Hume | 280/432 X |
| 3,265,406 | 8/1966 | Russell | 280/406 A |
| 3,649,046 | 3/1972 | Mathisen | 280/406 A |

*Primary Examiner*—Leo Friaglia
*Assistant Examiner*—Randall A. Schrecengost
*Attorney, Agent, or Firm*—Everett G. Clements

[57] ABSTRACT

A draw bar for a load transferring trailer hitch is made of two corrugated metal sheets secured to a socket member at one end and having a downwardly bent extension at the other or forward end. The draw bar is attached beneath a towing vehicle by hooking the downwardly bent extension into a slot on a crossbar secured to the towing vehicle and bolting the socket end of the draw bar to another crossbar secured to the vehicle. The socket is adapted to receive the shank of a hitch head for a load transferring hitch.

8 Claims, 5 Drawing Figures

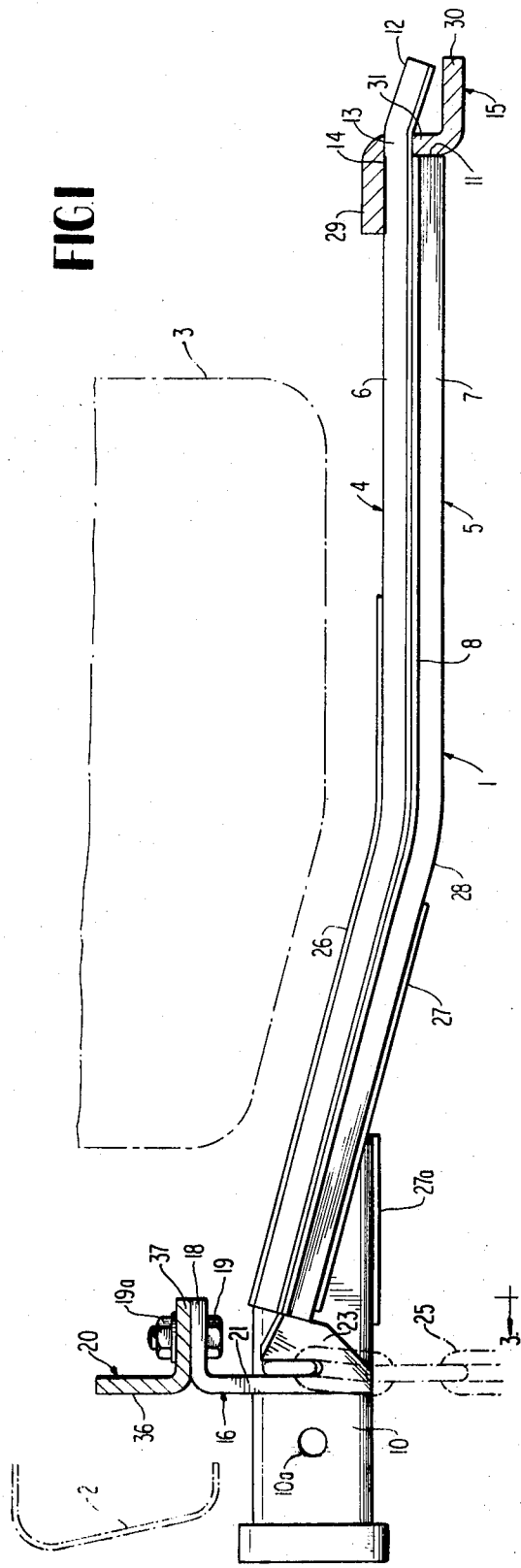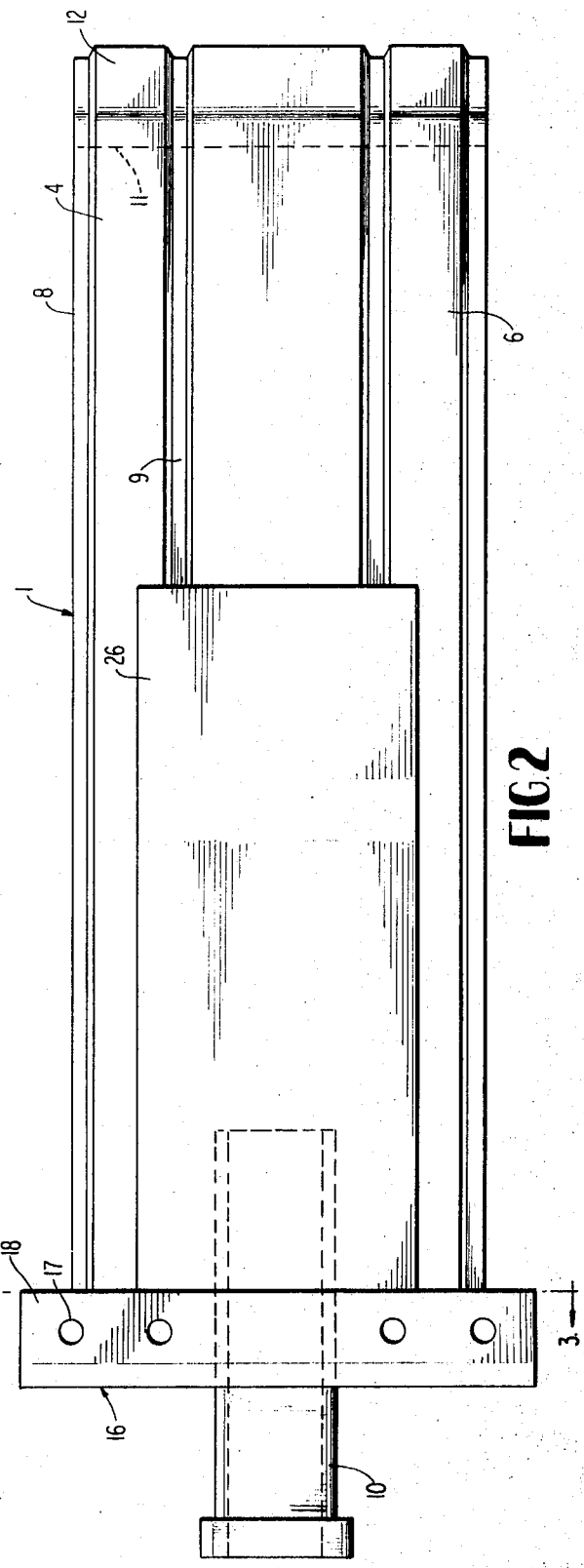

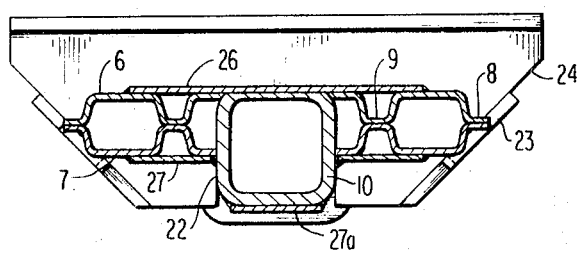
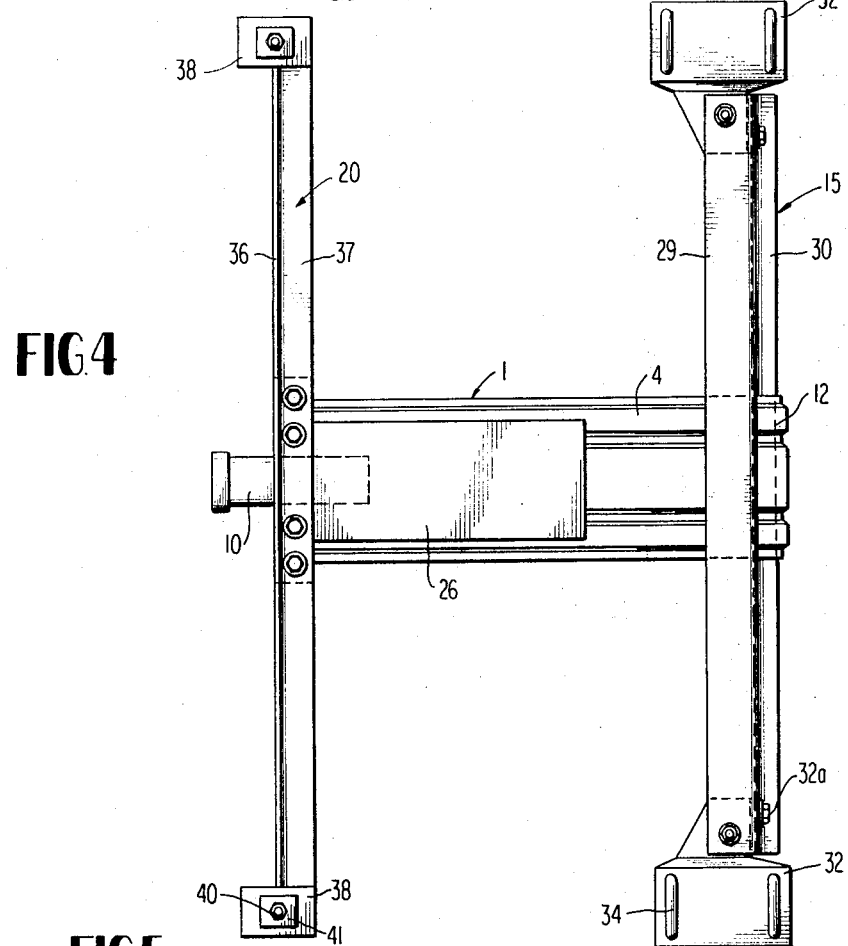
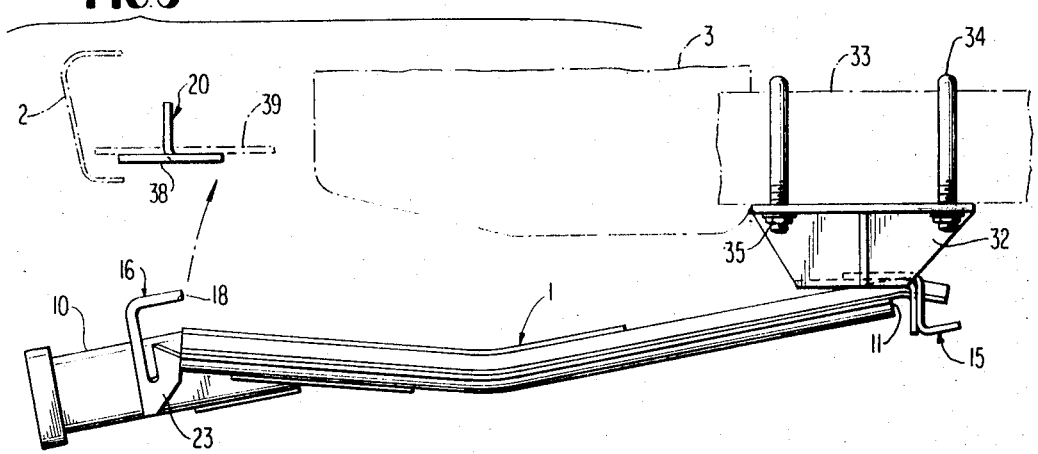

DRAW BAR

BACKGROUND OF THE INVENTION

This invention relates to a draw bar for a load transferring hitch. The draw bar, in use, extends underneath a portion of the towing vehicle, generally from near the rear bumper to a position near the forward edge of the gasoline tank commonly located at the bottom and rear of the vehicle. A draw bar of this general type is shown in the patent to Mathisen U.S. Pat. No. 3,649,046, issued Mar. 14, 1972, said draw bar functioning to receive and be attached to the shank of the hitch head and to transmit the towing forces to the towing vehicle including lateral forces, both vertical and horizontal and twisting or torsion forces about a longitudinal axis. The draw bar of the invention is an improvement over that of the patent in ways which will be indicated below.

SUMMARY OF THE INVENTION

It is an object of the invention to provide a draw bar which may be easily assembled with or disassembled from the towing vehicle.

Another object is to provide a draw bar which furnishes a substantial degree of protection to the fuel tank of the towing vehicle.

Another object is to provide a draw bar which is shallow in depth, thereby increasing the ground clearance in comparison to prior draw bars.

Another object is to provide a draw bar which is relatively wide in comparison to prior draw bars whereby torsional stresses about a longitudinal axis exert less force on the cross members attaching the draw bar to the towing vehicle.

Another object is to provide a draw bar incorporating hooks for the attachment of safety chains.

To achieve these and other objects which will become apparent as the description proceeds I provide a draw bar made of a pair of corrugated metal sheets which have a width approximately one-third of their length, the said sheets being welded to a socket member at one end and having a downturned extension at the other end. Also welded to the socket is a bracket adapted to be bolted to a cross member on the towing vehicle, said bracket including a pair of hook parts for the attachment of safety chains. The draw bar is attached to the towing vehicle by simply hooking the extension into a slot on a crossbar, pivoting the tow bar upwardly about the region of the slot and bolting the bracket welded to the socket to another cross member on the towing vehicle.

BRIEF DESCRIPTION OF THE DRAWINGS

FIG. 1 is a side elevation of the draw bar shown attached to crossbars on the towing vehicle, the crossbars being shown in section.

FIG. 2 is a plan view of the draw bar detached from the vehicle.

FIG. 3 is a sectional view on line 3—3 of FIG. 2.

FIG. 4 is a plan view of the draw bar attached to crossbars secured to the towing vehicle.

FIG. 5 is a side elevation of FIG. 4 with the draw bar in the process of being attached to the crossbars.

DESCRIPTION OF THE PREFERRED EMBODIMENT

In FIG. 1 the draw bar 1 is shown in a normal position of use beneath a towing vehicle, the rear bumper 2 and the fuel tank 3 of the vehicle being shown in dotted lines.

The draw bar comprises an upper sheet 4 and a lower sheet 5, sheet 4 having three corrugations 6 and sheet 5 having three corrugations 7, all the corrugations running longitudinally and the sheets being spot welded together at the margins 8 and at portions 9 between the corrugations so that in effect the draw bar comprises four hollow beam portions.

At the rear end of sheets 4 and 5 a socket member 10 is welded to the sheets, the socket 10 being welded to the midpoint of the sheets at the rear end and extending rearwardly from the sheets. The socket member is adapted to receive and be secured to the shank of the hitch head of a load transferring hitch of the general type shown in Mathisen U.S. Pat. No. 3,649,046. Hole 10a in socket 10 receives a pin which passes through the shank to fasten it to the socket.

At the forward end of the draw bar sheet 5 is cut to form a shoulder 11 and the corresponding end of sheet 4 is continued to form a downturned extension or hook portion 12, said extension including a short portion 13 which continues rearwardly without being downturned. The extension 12 passes through a slot 14 in a crossbar 15 which will be more fully described hereinafter.

An angle bracket 16 is welded to socket 10 and extends transversely thereof, said angle bracket having holes 17 in the horizontal flange part 18 to receive bolts 19 having nuts 19a screwed thereon for fastening to a crossbar 20, more fully described hereinafter. The angle bracket 16 has a vertical flange 21, having an opening 22 (see FIG. 3) through which the socket 10 passes, the socket 10 being welded to the flange 21 along the sides of the opening. Flange 21 also has hooks 23 at each end of the flange, these hooks projecting outwardly and upwardly from inclined edges 24. The sheets 4 and 5 are welded to hook parts 23 where they touch. Hooks 23 are provided for securing safety chains 25 to the draw bar 1 and thus through the intermediary of the draw bar to the towing vehicle.

A top reenforcing plate 26 is welded along its edges to sheet 4 and bottom reenforcing plates 27 are welded along their edges to bottom sheet 5. A reenforcing plate 27a is welded along its edges to the bottom of socket 10.

Sheets 4 and 5 are bent along a transverse line at 28 in order to bring the ends of the draw bar into proper position for attachment to the crossbars 15 and 20.

As can be seen most clearly in FIGS. 4 and 5 crossbars 15 and 20 are fastened to the towing vehicle in order to provide a means for securing the draw bar to the towing vehicle. Crossbar 15 is a Z-bar having an upper flange 29, a lower flange 30 and an intermediate web 31. The slot 14 for receiving extension 12 is provided in web 31. At its ends the crossbar 15 is secured to bracket members 32 by bolts and nuts 32a, the bolts passing through flange 29 and web 31. Brackets 32 are secured to side frame members 33 of the towing vehicle by U-bolts 34 and nuts 35 screwed on to the ends of the bolts.

Crossbar 20 is an angle bar having a vertical flange 36 and a horizontal flange 37, the horizontal flange having holes receiving bolts 19. The ends of crossbar 20 are flattened to form pads 38 for securing the crossbar by bolt means to frame members 39 of the towing vehicle. Bolt means 40 and a washer 41 are shown in FIG. 4 but omitted in FIG. 5 for clarity of presentation.

Longitudinal towing forces are transmitted to the towing vehicle principally by the rear crossbar 20. The front crossbar 15 together with the rear crossbar transmits lateral vertical forces due to the lever action of the draw bar when acting to equalize the load. Torsional stresses due to tilting of the trailer with respect to the towing vehicle, and various other stresses which may arise are also transmitted to the towing vehicle by the crossbars.

As indicated in FIG. 5 the draw bar 1 is secured to the crossbars by simply hooking the extension or hook portion 12 into the slot 14 and then lifting the socket end of the draw bar straight up without tilting about a longitudinal axis to bring flange 18 against flange 37 and fasten bracket 16 to the crossbar 20 by bolts 19 and nuts 19a.

In the use of this device crossbars 15 and 20 are ordinarily fitted to a vehicle at a shop and generally remain attached to the vehicle. It will be understood that crossbars 15 and 20 and their connections to the vehicle are merely exemplary of such connections. The precise nature of these means will vary with each different vehicle structure. Draw bar 1 may, however, be readily attached and detached by the ultimate users of the vehicle. Thus, an owner of the vehicle may have the crossbars and draw bar installed at a shop in order to hitch a trailer to his vehicle. If afterward the trailer will not be used for a substantial amount of time the owner may readily detach the draw bar from the crossbars and later attach it again when a trailer is to be used. The advantage of removing the draw bar is that the clearance of the vehicle is increased and that the normal collapsibility of the vehicle is not impaired in case of a rear end collision. If the draw bar is fixed to the vehicle, in case of a rear end collision impact stresses will be transmitted through the frame of the vehicle, in other words the normal collapsibility of the vehicle is impaired. Thus the ready removability of the draw bar constitutes an important safety feature.

It will be noted that my draw bar is approximately one-third as wide as it is long. It is therefore very substantially wider than prior draw bars and this offers a substantial amount of protection to the fuel tank, which is important particularly under off-highway conditions. Further my draw bar is thinner in vertical dimensions than prior draw bars and so the clearance of the towing vehicle is increased.

Typical dimensions of a prior draw bar are 2.5 inches by 2.5 inches in cross section. Typical dimensions in cross section of my draw bar are 1.25 inches high and 9 inches wide.

The increased width of the draw bar also is an important feature in the better distribution of torsional stresses to the towing vehicle, such torsional stresses arising due to tilting of the trailer with respect to the towing vehicle about a longitudinal axis.

I claim:

1. A draw bar for a load transferring hitch for positioning under a towing vehicle, said draw bar comprising a member having socket means at its rear end, means at its front end for hooking onto a first part carried by said towing vehicle and means in the region of its rear end for bolting to a second part carried by the towing vehicle, said draw bar being assembled with the towing vehicle by first attaching the hooking means to said first part, then, without tilting the draw bar about its longitudinal axis, pivoting the draw bar upwardly about said hooking means and then bolting the said means for bolting to said second part, further comprising a pair of corrugated sheets, the corrugations of each sheet running longitudinally and the corrugations of one sheet being opposite the corrugations of the other sheet.

2. In a load transferring hitch, a draw bar positioned underneath a towing vehicle, said draw bar having means at its rear end for connection to a portion of said hitch and extending forwardly of said towing vehicle underneath the fuel tank of said vehicle, said draw bar being relatively wide with respect to its length to afford substantial protection to said fuel tank, and comprising a pair of corrugated sheets with the corrugations running longitudinally and the corrugations of one sheet positioned opposite the corrugations of the other sheet.

3. In a load transferring hitch as claimed in claim 2, the draw bar comprising a corrugated sheet with the corrugations running longitudinally.

4. A load transferring trailer hitch comprising,
a substantially planar draw bar structure having socket means at its rear end and tongue means projecting from its other and terminating in a forwardly extending portion which is also directed downwardly from the plane of the bar to make an obtuse angle therewith,
vertically extending wall means attached to the underside of a towing vehicle forwardly of its rearwardly located fuel tank and having a rearwardly facing opening therethrough for slidably receiving the tongue means as the draw bar is moved forwardly with its rear end portion below the level of the tongue means which is positioned horizontally while sliding through said opening,
and means for detachable securing the rear end of the draw bar to the vehicle rearwardly of the fuel tank when its rear end portion is swung upwardly without turning about a horizontal plane with the inner corner of the angle formed between the tongue means and the bar fulcrumed on the lower surface of the wall of said opening to hook the downwardly extending tongue means therein when the draw bar extends in a generally horizontal towing position the width of the bar being substantially one-third the length thereof.

5. A load transferring trailer hitch as in claim 4 wherein said draw bar is provided with forwardly facing shoulder means for abutting the rear surface of said wall means when the draw bar is secured to the rear end of the vehicle.

6. A load transferring trailer hitch as in claim 5 wherein said forwardly facing shoulder means extends downwardly from said draw bar.

7. A load transferring trailer hitch as in claim 4 wherein the tongue means extends the entire width of said draw bar.

8. A load transferring trailer hitch as in claim 4 wherein the means for detachably securing the rear end of the draw bar to the vehicle constitutes the only structure for attaching to and detaching the draw bar from the vehicle.

* * * * *